(12) United States Patent
Kato

(10) Patent No.: US 9,257,885 B2
(45) Date of Patent: Feb. 9, 2016

(54) MOTOR

(75) Inventor: Tomokuni Kato, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 290 days.

(21) Appl. No.: 13/995,509

(22) PCT Filed: Mar. 25, 2011

(86) PCT No.: PCT/JP2011/001783
§ 371 (c)(1),
(2), (4) Date: Jun. 19, 2013

(87) PCT Pub. No.: WO2012/131750
PCT Pub. Date: Oct. 4, 2012

(65) Prior Publication Data
US 2013/0270972 A1  Oct. 17, 2013

(51) Int. Cl.
*H02K 5/00* (2006.01)
*H02K 7/00* (2006.01)
*H02K 11/00* (2006.01)

(52) U.S. Cl.
CPC ................................. *H02K 11/0021* (2013.01)

(58) Field of Classification Search
CPC ................................................ H02K 11/0021
USPC .................. 310/68 B, 156.08, 156.22; 16/2.1
See application file for complete search history.

(56) References Cited

U.S. PATENT DOCUMENTS

| | | | |
|---|---|---|---|
| 4,297,604 A * | 10/1981 | Tawse | ........................... 310/168 |
| 6,452,383 B1 | 9/2002 | Goedecke | |
| 2002/0104187 A1* | 8/2002 | Kakamu et al. | ................... 16/2.1 |
| 2006/0022546 A1 | 2/2006 | Kon et al. | |
| 2008/0211357 A1* | 9/2008 | Kataoka et al. | ............. 310/68 B |
| 2010/0270872 A1* | 10/2010 | Yokoyama et al. | ............. 310/43 |

FOREIGN PATENT DOCUMENTS

| | | |
|---|---|---|
| DE | 199 05 274 A1 | 8/2000 |
| JP | 2003-032988 A | 1/2003 |
| JP | 2004-48904 A | 2/2004 |
| JP | 2008-289235 A | 11/2008 |
| JP | 2009-33850 A | 2/2009 |
| WO | WO 2009/084132 A1 | 7/2009 |

* cited by examiner

*Primary Examiner* — Tran Nguyen
(74) *Attorney, Agent, or Firm* — Birch, Stewart, Kolasch & Birch, LLP

(57) ABSTRACT

A motor is provided with an insert nut 10 that has a knurled part 101 at two places on the surface thereof along an axial direction thereof with projections 103 for whirl stop and slip-off stop formed on the knurled part, and that is embedded between the motor rotor 3 and the magnet assembly 7 to perform fastening between the motor rotor 3 and the magnet assembly 7, and in the insert nut 10, a concave part 104 between the knurled parts 101 is situated at a mounting boundary between the motor rotor 3 and the magnet assembly 7.

3 Claims, 2 Drawing Sheets

MOTOR

TECHNICAL FIELD

The present invention relates to a motor including a motor rotor, and a magnet assembly for a sensor for detecting the rotational position of the motor rotor.

BACKGROUND ART

Conventionally, in a motor such as a motor for an EGR (Exhaust Gas Recirculation) valve, in order to detect the rotational position of a motor rotor with high precision by a position detection hole sensor, the motor rotor and the magnet assembly for the position detection hole sensor are fastened without looseness. Specifically, the top end portion of the motor rotor is first press-fit into a fastener hole formed in the magnet assembly. As a result, it is possible to ensure the whirl-stop strength between the motor rotor and the magnet assembly. Then, a tip resin part protruding from the motor rotor through the fastener hole of the magnet assembly is subjected to ultrasonic staking, and the tip resin part is melted to perform cover latching at the top of the magnet assembly. This can ensure the slip-off stop strength in the axial direction of the magnet assembly to the motor rotor (for example, see Patent Document 1).

PRIOR ART DOCUMENTS

Patent Documents

Patent Document 1: Japanese Patent Application Laid-open No. 2004-48904

SUMMARY OF THE INVENTION

Problems to be Solved by the Invention

As described above, in the conventional motor disclosed in Patent Document 1, in order to ensure the slip-off stop strength of the magnet assembly to the motor rotor, the ultrasonic staking is performed. At this step, a resin welding condition for the ultrasonic staking is optimized in order to improve the slip-off stop strength. However, in the ultrasonic staking, the robustness of the welding condition is small, and hence there is a problem such that a very large manufacturing load becomes necessary to be imposed in the quality control over the strength of the region that is subjected to the ultrasonic staking.

The present invention is made to solve the aforementioned problem, and an object of the invention is to provide a motor such that in addition to reduction of the manufacturing load with a simple configuration, a motor rotor and a magnet assembly can be fastened, and that further enhancement of the strength of the fastened portion can be improved and/or suppression of the looseness can be achieved.

Means for Solving the Problem

A motor in accordance with the invention includes: an insert nut that has a knurled part at two places on the surface thereof along an axial direction thereof with projections for whirl stop and slip-off stop formed on the knurled part, and that is embedded between the motor rotor and the magnet assembly to perform fastening between the motor rotor and the magnet assembly, and in the insert nut a concave part between the knurled parts is situated at a mounting boundary between the motor rotor and the magnet assembly.

Effect of the Invention

According to the invention, with the foregoing configuration, it is possible to perform the fastening between the motor rotor and the magnet assembly in addition to reduction of the manufacturing load with a simple configuration, and it is further possible to achieve enhancement of the strength of the fastened portion and suppression of the looseness.

BEST MODE FOR CARRYING OUT THE INVENTION

In the following, embodiments of the present invention will be described with reference to the accompanying drawings.

Embodiment 1

First, a description will be given to a configuration of an EGR valve motor 1.

Figure 1:
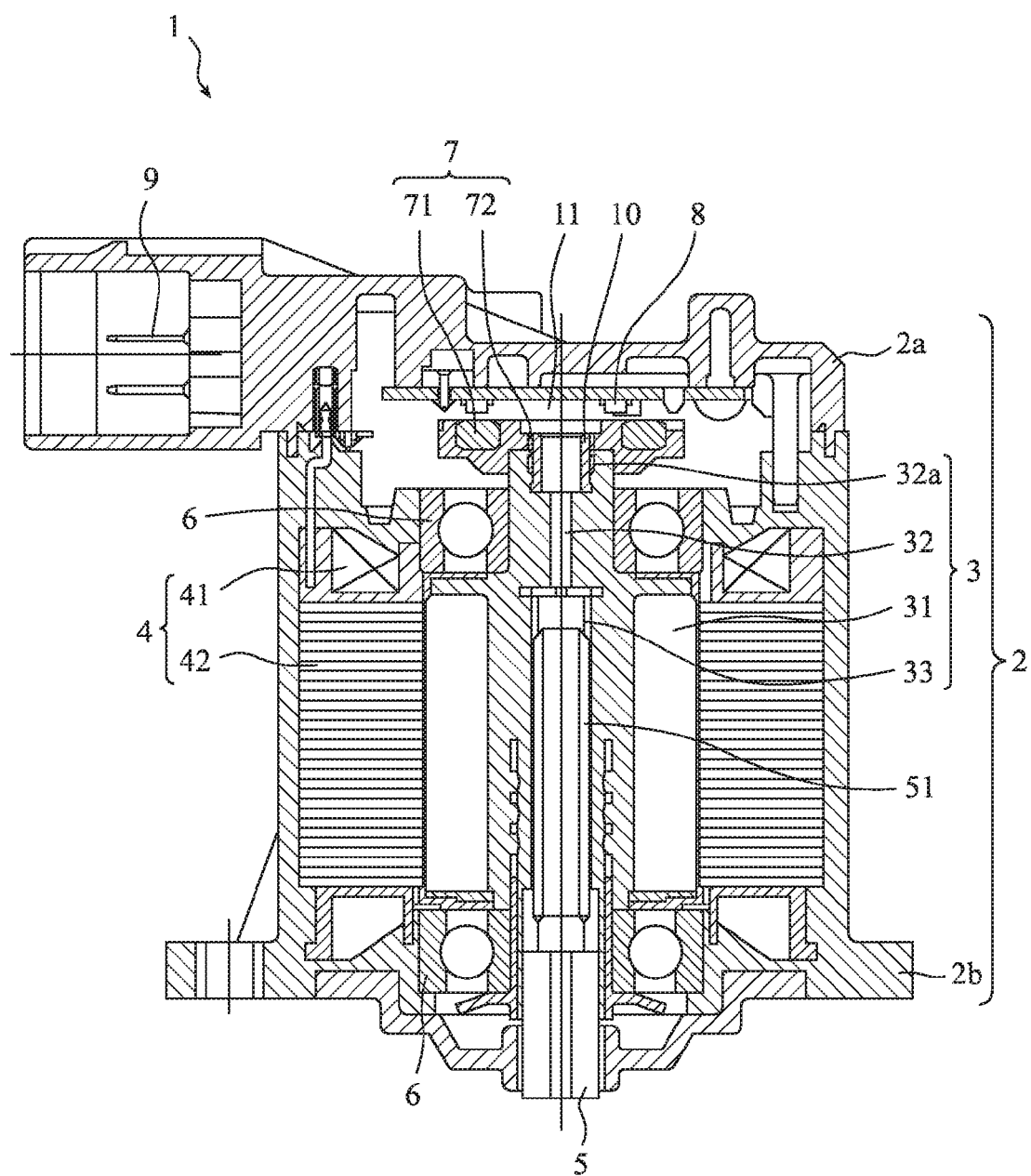
FIG. 1 is a cross-sectional view showing a configuration of a motor for an EGR valve in accordance with Embodiment 1 of the present invention.

As shown in FIG. 1, within a housing 2 of the EGR valve motor 1, there is provided with a motor rotor 3 in which a magnet 31 polarized into a prescribed number of poles is insert-formed; and a stator assembly 4 including a core 42 disposed on the outer circumference of the motor rotor 3 and having a multi-phase coil 41 wound therearound.

Further, a female screw 33 is formed at the bottom of a hole 32 formed at the center of the axis of the motor rotor 3, and a fastener hole 32a for fastening to a magnet assembly 7 described later is formed at the top thereof. A shaft 5 with a male screw 51 formed at the top thereof is engaged with the motor rotor 3 via a female screw 33. Further, bearings 6 for supporting rotatably the motor rotor 3 are arranged at both top and bottom ends of the motor rotor 3.

Further, the magnet assembly 7 in which a magnet 71 is insert-formed is mounted at the top of the motor rotor 3. A fastener hole 72 substantially equal in diameter to the fastener hole 32a is formed at the center of the axis of the magnet assembly 7. Also, a plurality of position detection hole sensors 8 are arranged opposite to the magnet assembly 7. The position detection hole sensor 8 detects the magnetic force from the magnet 71 to thereby detect the rotational position of the motor rotor 3.

Further, a connector part 9 for outputting the detection result by the position detection hole sensor 8 to an external control device (not shown) and for inputting an electric power from the external control device to each coil 41 is provided at the top of the housing 2.

Incidentally, the housing 2 can be divided into a top housing 2a and a bottom housing 2b.

In the EGR valve motor 1 thus configured, based on the rotational position of the motor rotor 3 detected by the position detection hole sensor 8, the supply of the electric power to each coil 41 is switched at the external control device.

Then, the core 42 is magnetized according to the supply of the electric power to each coil 41; accordingly, an attractive force and a repulsive force are alternately generated between the polarized poles of the magnet 31, and the motor rotor 3 is therefore rotated. Then, when the motor rotor 3 is rotated, the turning force (torque) is converted into a translatory power by the female screw 33/the male screw 51 to thus move vertically the shaft 5.

As described above, the position detection hole sensor 8 detects the rotational position of the motor rotor 3 via the magnet assembly 7. However, when the fastened portion between the motor rotor 3 and the magnet assembly 7 undergoes insufficient strength and looseness, an error may be caused between the detection result by the position detection hole sensor 8 and the actual rotational position of the motor rotor 3. In order to improve the error, the enhancement of the strength and/or the suppression of the looseness in the fastened portion between the motor rotor 3 and the magnet assembly 7 are required.

Thus, hereinafter, a description will be given to a method for fastening the motor rotor 3 and the magnet assembly 7 with the insert nut 10.

Figure 2:
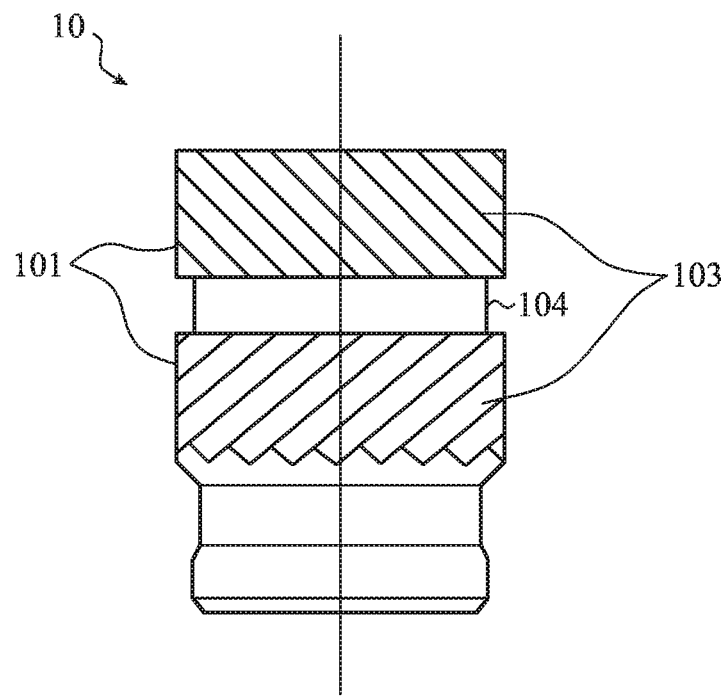
FIG. 2 is a view showing a configuration of an insert nut in Embodiment 1 of the invention.
Figure 3:
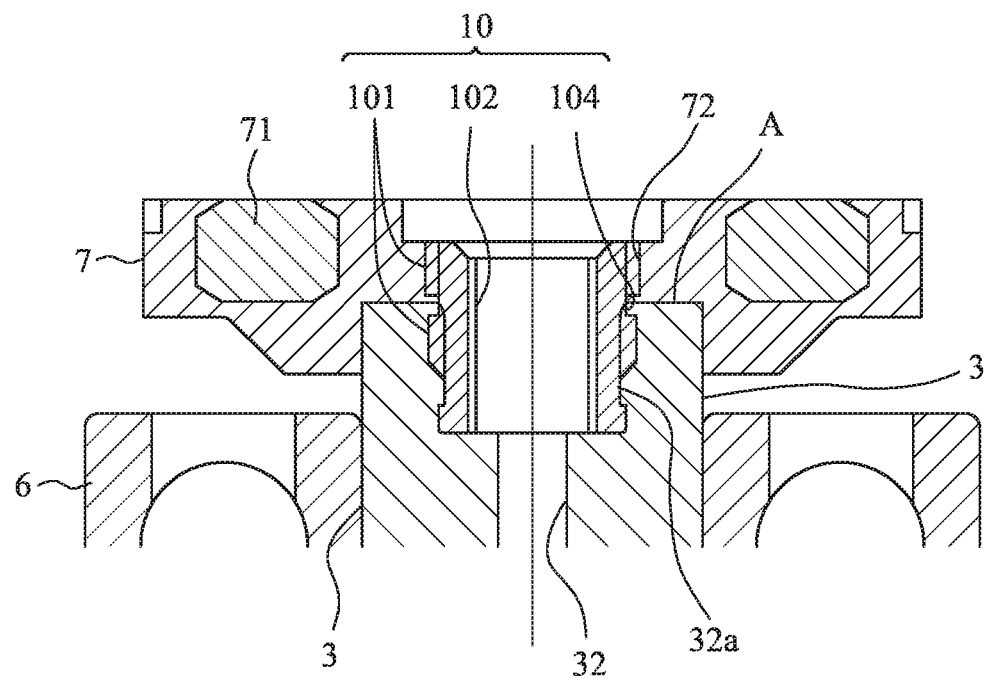
FIG. 3 is an enlarged cross-sectional view showing a fastened portion between a motor rotor and a magnet assembly by the insert nut in Embodiment 1 of the invention.

The insert nut 10 is an embedded type tubular member by heat press-fitting or the like. As shown in FIGS. 2 and 3, knurled parts (roulette part) 101 are formed in a ring along the axial direction at a prescribed interval (for example, an interval of 2 to 3 mm) on the surface of the insert nut 10, and a female tapped hole 102 is formed thereon. As shown in FIG. 2, spiral projections 103 for slip-off stop and whirl-stop after embedding are formed on the surface of the knurled part 101. Further, a concave part 104 smaller in diameter than the knurled part 101 is formed in a ring between the upper and lower knurled parts 101.

Incidentally, in the insert nut 10 for use in the fastening between the motor rotor 3 and the magnet assembly 7, the one of a non-magnetic body is used to eliminate the disturbance of the magnetic field by the magnet 71.

When the fastening between the motor rotor 3 and the magnet assembly 7 is performed using the insert nut 10 as described above, the magnet assembly 7 is first disposed coaxially at the top of the motor rotor 3. Then, the insert nut 10 is disposed at the top of the fastener hole 72 of the magnet assembly 7.

Then, the insert nut 10 is embedded between the fastener hole 32a of the motor rotor 3 and the fastener hole 72 of the magnet assembly 7 by heat press-fitting. Namely, with the insert nut 10 heated, while the resin in the vicinity of the fastener holes 32a and 72 is melted, the insert nut 10 is press-fit thereinto. At this step, as shown in FIG. 3, the embedding position of the insert nut 10 is adjusted so that the concave part 104 is situated at the mounting boundary between the motor rotor 3 and the magnet assembly 7 (the portion indicated with a reference sign A of FIG. 3).

In such a way, when the insert nut 10 is embedded between the motor rotor 3 and the magnet assembly 7 by heat press-fitting, the molten resin enters into the spiral projections 103 on the surface of the knurled part 101. As a result, the whirl-stop strength/slip-off stop strength of the motor rotor 3 and the magnet assembly 7 can be ensured to perform the fastening without looseness. Further, when the insert nut 10 is embedded so that the concave part 104 is situated at the mounting boundary between the motor rotor 3 and the magnet assembly 7, it becomes possible to improve the fastening strength between the motor rotor 3 and the magnet assembly 7 because of the anchor effect by the upper and lower knurled parts 101.

Incidentally, since it is possible to improve the fastening strength between the motor rotor 3 and the magnet assembly 7 by only the insert nut 10, male screw parts used in a set with the insert nut are usually unnecessary.

Then, in a condition where the motor rotor 3 and the magnet assembly 7 are fastened by the insert nut 10, respective magnets 31 and 71 are simultaneously magnetized. This can prevent the relative magnetic pole phase shift of the magnets 31 and 71.

Then, the fastened motor rotor 3 and magnet assembly 7 are inserted from the top side of the stator assembly 4 to thereby perform the mounting into the housing 2 (bottom housing 2b).

Here, in a conventional motor, a tip resin part protruding from a motor rotor is molten to thus perform cover latching at the top of a magnet assembly. That is why the air in a hole of the motor rotor is in a state hermetically sealed by the upper end of a shaft and the tip resin part. Then, when the shaft vertically moves in this state, the air in the hole of the motor rotor is compressed or expanded, and hence it is concerned that a load power to the translatory motion of the shaft is generated.

However, as shown in FIG. 3, the motor rotor 3 and the magnet assembly 7 are fastened with only the insert nut 10, and thus the female tapped hole 102 of the insert nut 10 can be used as a breathing hole for establishing communication between the hole 32 of the motor rotor 3 and the outside space 11 over the magnet assembly 7 (see FIG. 1). Namely, the hole 32 and the outside space 11 are communicated with each other via the female tapped hole 102; this enables the air in the hole 32 to flow out into the outside space 11, or the air in the outside space 11 to flow into the hole 32 in vertical movement of the shaft 5. Incidentally, the volume of the outside space 11 is sufficiently larger relative to the volume of the hole 32, and hence it is possible to absorb the flow of the air inside the hole 32 in accordance with the movement of the shaft 5 by the outside space 11. For this reason, the occurrence of a pressure inside the hole 32 of the motor rotor 3 can be prevented, and the generation of the load power to the translatory motion of the shaft 5 can be avoided.

Further, in the motor rotor 3 and the magnet assembly 7, the magnetized magnets 31 and 71 are insert-formed, respectively. Especially, for the magnet assembly 7, the generation of a fine magnetic force to the position detection hole sensor 8 is required. Namely, when the magnetic field by the magnet 71 is disturbed by disturbance, an error may be caused in the detection result at the position detection hole sensor 8. Thus, the nut of a non-magnetic body is adopted in the insert nut 10 used in the fastening between the motor rotor 3 and the magnet assembly 7. In this manner, the disturbance of the magnetic field by the magnet 31 can be prevented.

Meanwhile, in the conventional motor, there is also the following method: after a motor rotor is pressed into a magnet assembly, a tip resin part projecting from the motor rotor is heated, so that the tip resin part is molten to thereby perform cover latching at the top of the magnet assembly. However, in this case, when heat is applied to the resin at the press-fit portion, the press-fitting force is weakened, resulting in the reduction of the whirl-stop strength between the motor rotor and the magnet assembly.

However, when the insert nut 10 is used for the fastening between the motor rotor 3 and the magnet assembly 7, the projection 103 of the knurled part 101 is not changed by heating, thereby preventing the reduction of the whirl-stop strength.

As described above, in accordance with the Embodiment 1, it is configured to include: an insert nut 10 that has a knurled part 101 at two places on the surface thereof along an axial direction thereof with projections 103 for whirl stop and slip-off stop formed on the knurled part, and that is embedded between the motor rotor 3 and the magnet assembly 7 to perform fastening between the motor rotor 3 and the magnet assembly 7, such that in the insert nut 10 a concave part 104 between the knurled parts 101 is situated at a mounting boundary between the motor rotor 3 and the magnet assembly 7, and hence the fastening between the motor rotor 3 and the magnet assembly 7 can be performed in addition to the reduction of the manufacturing load with a simple configuration to thereby achieve the enhancement of the strength of the fastened portion and the suppression of the looseness.

Incidentally, in Embodiment 1, a description is given using the insert nut 10 having the shape as shown in FIG. 2; however, it is not limited thereto, and any shape is acceptable so long as it is a shape having an anchor effect, and a shape capable of ensuring the whirl-stop strength and the slip-off stop strength for the motor rotor 3 and the magnet assembly 7.

Further, in the present invention, a modification of any components of the embodiment, or an omission of any components of the embodiment is possible within the scope of the invention.

INDUSTRIAL APPLICABILITY

According to the motor in accordance with the invention, in addition to the reduction of the manufacturing load with a simple configuration, the motor rotor and the magnet assembly can be fastened, and it is possible to achieve the enhancement of the strength of the fastened portion and the suppression of the looseness; accordingly, the motor is suitable for use in a motor including a motor rotor, a magnet assembly for a sensor for detecting the rotational position of the motor rotor, or the like.

DESCRIPTION OF REFERENCE NUMERALS

1 EGR valve motor, 2 Housing, 2a Top housing, 2b Bottom housing, 3 Motor rotor, 4 Stator assembly, 5 Shaft, 6 Bearing, 7 Magnet assembly, 8 Position detection hole sensor, 9 Connector part, 10 Insert nut, 11 Outside space, 31 Magnet, 32 Hole, 32a Fastener hole, 33 Female screw, 41 Coil, 42 Core, 51 Male screw, 71 Magnet, 72 Fastener hole, 101 Knurled part, 102 Female tapped hole, 103 Projection, 104 Concave part.

The invention claimed is:

1. A motor including a motor rotor, and a magnet assembly for a sensor for detecting a rotational position of the said motor rotor, the motor comprising:
   an insert nut that has a knurled part at two places on the surface thereof along an axial direction thereof with projections for whirl stop and slip-off stop formed on the knurled part, and that is embedded between the motor rotor and the magnet assembly to perform fastening between the motor rotor and the magnet assembly,
   wherein in the insert nut a concave part between the knurled parts is situated at a mounting boundary between the motor rotor and the magnet assembly, and
   wherein the motor rotor and the magnet assembly are fastened with only the insert nut, and
   wherein a tapped hole of the insert nut is used as a breathing hole for establishing communication between an outside space and a hole of the motor rotor engaged with a shaft.

2. The motor according to claim 1, wherein the insert nut is a non-magnetic body.

3. The motor according to claim 1, wherein a magnet included in the motor rotor and a magnet included in the magnet assembly are simultaneously magnetized after the motor rotor and the magnet assembly are fastened by the insert nut.

* * * * *